US006783010B1

(12) United States Patent  
Berger

(10) Patent No.: US 6,783,010 B1
(45) Date of Patent: Aug. 31, 2004

(54) GLASS PANE HANDLING ASSEMBLY

(75) Inventor: Monte R. Berger, Udall, KS (US)

(73) Assignee: Unruh Fab, Inc., Sedgwick, KS (US)

( * ) Notice: Subject to any disclaimer, the term of this patent is extended or adjusted under 35 U.S.C. 154(b) by 26 days.

(21) Appl. No.: 10/264,955

(22) Filed: Oct. 4, 2002

(51) Int. Cl.[7] .............................................. A47G 19/08
(52) U.S. Cl. .................................................. 211/41.14
(58) Field of Search ........................... 211/41.14, 49.1, 211/50, 13.1, 41.1; 224/403

(56) References Cited

U.S. PATENT DOCUMENTS

| | | | | |
|---|---|---|---|---|
| 5,884,778 A | * | 3/1999 | Freiheit | 211/41.14 |
| 5,906,282 A | * | 5/1999 | Aldrich et al. | 211/41.14 |
| 6,247,601 B1 | * | 6/2001 | Norton et al. | 211/41.14 |

* cited by examiner

Primary Examiner—Hugh B. Thompson, II
Assistant Examiner—Sarah Purol
(74) Attorney, Agent, or Firm—Kenneth H. Jack; Davis & Jack, LLC

(57) ABSTRACT

A glass pane handling assembly consisting of a base frame having left and right roller tracks; a lock bar having a helical bolt receiving slot, the lock bar extending parallel to the left and right sides of the base frame; ball bearings interconnecting ends of the lock bar with the base frame; a glass carrying frame having upwardly extending glass pane supporting arms; rollers extending leftwardly and rightwardly from the glass carrying frame, the rollers interconnecting the base and glass carrying frames; a helical bolt extending into the lock bar's bolt receiving slot, the helical bolt being rigidly attached to the glass carrying frame; and an electric motor and pulley assembly operatively connected to the lock bar and adapted for alternately rotating and counter-rotating the lock bar.

15 Claims, 3 Drawing Sheets

GLASS PANE HANDLING ASSEMBLY

FIELD OF THE INVENTION

This invention relates to apparatus and assemblies for storing, transferring, and transporting automobile windshield and window covering panes of glass.

BACKGROUND OF THE INVENTION

Base frames for truck mounted glass rack carriages of the type disclosed in U.S. Pat. No. 6,247,601 issued Jun. 19, 2001 to Norton, et al., typically comprise a latch bar or lock bar spanning between forward and rearward ends of the base frame, such bar extending substantially parallel to roller tracks formed by the lateral left and right sides of the base frame. Such base frame mounted lock bar typically has a series of longitudinally spaced slots for selectively engaging with an alternately extendable and retractable latch or bolt. Such latch or bolt is typically supported upon a second glass carrying frame which is rollably mounted upon the tracks of the base frame. In operation of such assembly, withdrawal of the bolt or latch frees the glass carrying frame for rolling movement; and extension of the bolt or latch into one of the lock bar's slots resists rolling movement of the glass carrying frame.

A defect or disadvantage of assemblies such as described above is that operation of the glass rack upon an incline undesirably allows gravity to move and accelerate the glass carrying rack when the bolt is retracted and disengaged. Upon such disengagement an operator may be undesirably required to manually push or pull the weight of the glass rack up the incline.

The instant inventive assembly overcomes or ameliorates the problems described above by configuring the lock bar cylindrically, by configuring the bolt receiving slot to extend continuously along and helically about the lock bar, and by providing rotating means allowing the bolt and such slot to rotate with respect to each other. Such inventive configurations of the lock bar and bolt allow the lock bar and bolt assembly to perform triple functions of locking the glass carrying rack in place, extending such rack for loading and off-loading of glass panes, and retracting such rack for storage and transportation of glass panes.

BRIEF SUMMARY OF THE INVENTION

The instant inventive glass pane handling assembly preferably comprises a first rectangular base frame having left and right sides or rails which are preferably configured to include left and right roller track surfaces. Preferably, the left and right rails of the base frame comprise inwardly opening "C" channels, the concavities of such channels being fitted for receiving rollers. The left and right rails may suitably be differently configured provided that the rails present laterally paired longitudinally extending surfaces which are suitable for rolling support of rollers, wheels, linear roller bearings, linear ball bearings, or which are suitable for sliding support of skids. Cross beams preferably span between and rigidly interconnect the side rails, the cross beams in combination with the side rails forming a rigid bar frame. Typically, such frame is fixedly bolted to a truck bed.

A second frame or carriage for glass rack support is preferably similarly configured as a rigid bar frame, such frame preferably being fitted for receipt and longitudinal movement within the base frame. Rollers are preferably rotatably mounted upon the left and right sides of the glass rack supporting frame, such rollers extending laterally outward into the concavities of the preferred "C" channels of the left and right side rails of the base frame, such rollers allowing the glass rack supporting frame to roll longitudinally within the base frame. Suitably, linear roller bearings, or linear ball bearings may be alternately interposed between the glass rack supporting frame. Suitably, though less desirably, skids or slides comprising a high density low friction plastic such as high density polyethylene (HDPE) may be alternately interposed for facilitating sliding longitudinal movement.

A lock bar is necessarily mounted upon the base frame, preferably spanning between such frame's cross bracing members, and preferably extending substantially parallel to such frame's side rails. The lock bar necessarily has a bolt receiving slot extending helically along its longitudinal axis. The glass rack frame is necessarily interconnected with the lock bar by means of a bolt or tooth having a distal end, the bolt being mounted upon the glass rack frame and positioned for extension of its distal end into the lock bar's helical bolt receiving slot. Preferably, the bolt is configured helically, the bolt's helix angle and radius of curvature matching those of the bolt receiving slot of the lock bar.

The lock bar is preferably rotatably mounted at forward and rearward ends upon the base frame, such mounts allowing the lock bar to rotate about its longitudinal axis. Where the lock bar is mounted rotatably, the preferred helically configured bolt is preferably rigidly mounted upon the glass rack supporting frame. Where the inventive assembly utilizes such preferred configuration, alternate rotation and counter-rotation of the lock bar alternately drives and pulls the helical bolt, alternately extending and retracting the glass rack supporting frame. The matching helix angle of the bolt receiving slot and the bolt is preferably small, between eight degrees and twelve degrees, allowing the bolt and slot to function in combination as a lock in absence of application of rotational torque to the lock bar.

Suitably, the lock bar may be alternately rigidly mounted upon the base frame, and the preferred helical bolt may accordingly be rotatably mounted upon the glass rack supporting frame, such configuration allowing rotation and counter-rotation of the helical bolt to similarly alternately extend, retract, and fix in place the glass rack supporting frame. Such alternate configuration is less desirable since it requires mounting of motor means upon the moveable glass rack frame.

Preferably, the rotatable lock bar or, as the case may be, the rotatable helical bolt, are rotatably mounted by means of ball bearings. Suitably, bearing sleeves or roller bearings may be alternately utilized.

Where the instant inventive assembly is configured to include the preferred rotatably mounted lock bar, rotating means comprising a torque applying mechanism, preferably a reversible electric motor, but suitably an hydraulic motor or pneumatic motor, is utilized for rotating the lock bar. Power is preferably transmitted from the torque applying mechanism (electric, pneumatic or hydraulic, as the case may be) via a belt and pulley assembly, and preferably such mechanism is controlled by a network of power transmitting lines which incorporate a three position switch or valve, the three way switch or valve having a locked "power off" position, a forward motion position and a rearward motion position. Where a rotatable helical bolt and fixed lock bar assembly is alternately provided, such motor and belt and pulley assembly is preferably operatively connected to a rotatable nut which annularly supports the helical bolt, such nut being rotatably mounted upon the glass rack carrying frame.

Means for supporting glass panes upon the glass rack carrying frame are necessarily provided, such means preferably comprising a plurality of removably attached upwardly extending arms.

In operation of the inventive assembly, manipulation of the three way switch or valve alternately and selectively rotates, counter-rotates, and stops the torque applying mechanism, resulting in selective actuation, counter-actuation, and stopping of rotating motion of the lock bar with respect to the bolt, such selective actuation selectively extending, retracting, and locking in place the glass rack carrying frame with respect to the base frame.

Accordingly, it is an object of the present invention to provide a glass pane handling assembly which includes a base frame, a glass rack carrying frame adapted for longitudinal rolling or sliding movement with respect to the base frame, and comprising a lock bar and bolt assembly adapted for rotation with respect to each other, such assembly comprising nesting bolt and helical slot structures capable of alternate extension, retraction, and locking of the glass rack carrying frame.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
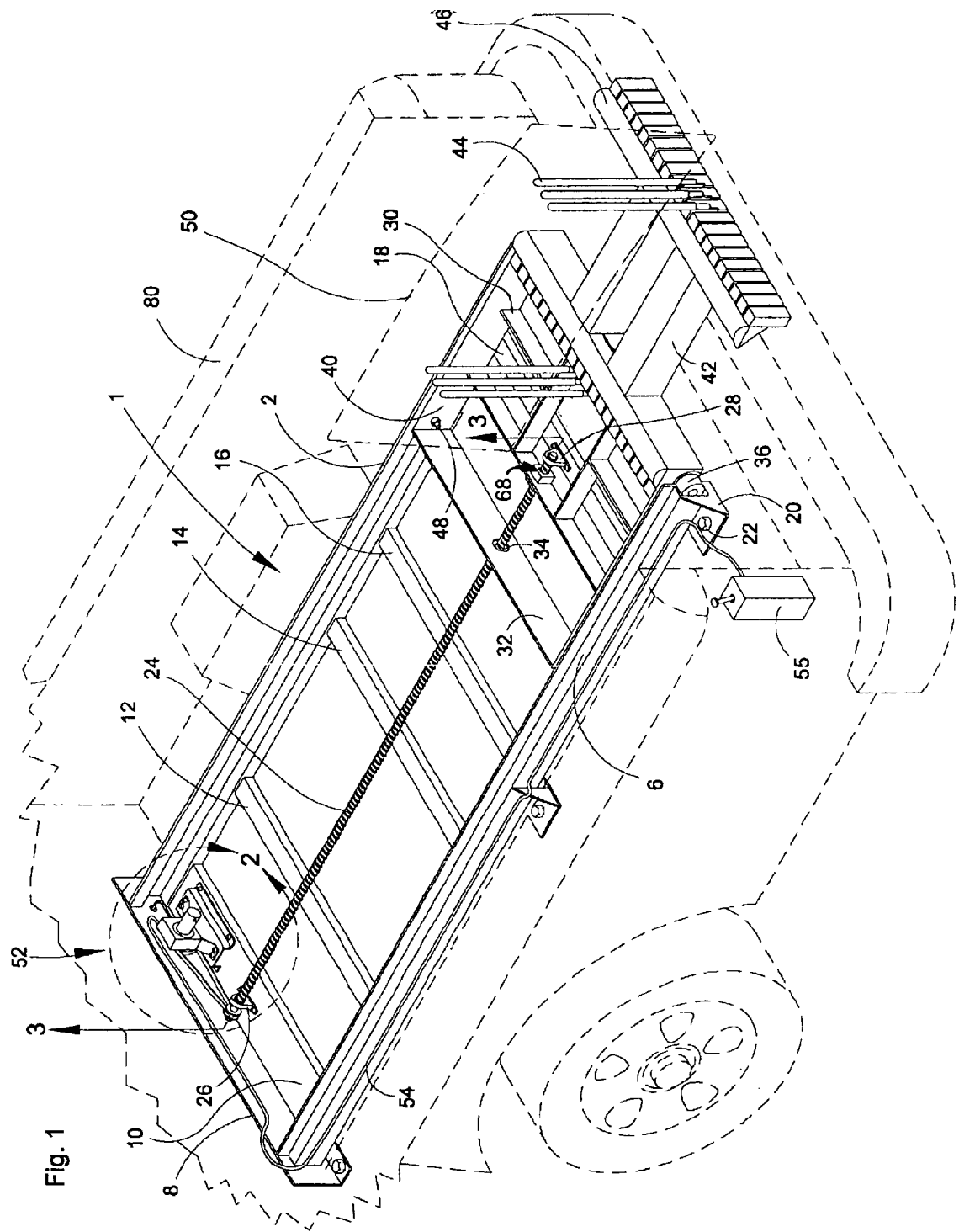
FIG. 1 is an isometric view of the instant inventive glass pane handling assembly, the view showing the assembly mounted upon a pickup truck bed, and showing the assembly in its rearwardly extended position.
Figure 2:
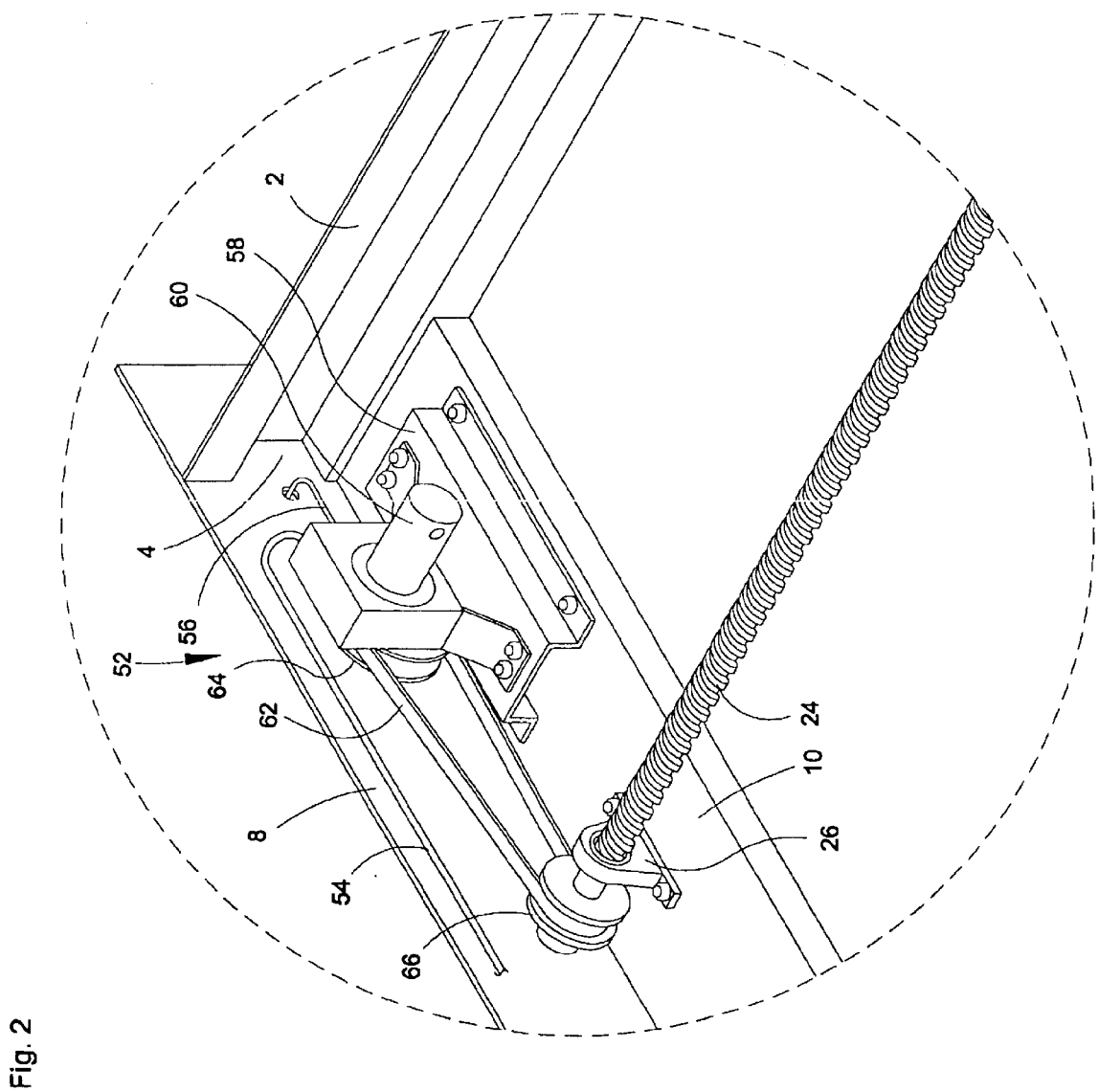
FIG. 2 is a magnification of a portion of FIG. 1, as indicated in FIG. 1.

Referring now to the drawings, and in particular to FIG. 1, the instant inventive glass pane handling assembly is referred to generally by Reference Arrow 1. The assembly 1 is mounted by means of spirally threaded nut and bolt combinations 22 which extend through mounting flanges or feet 20 for engagement with the floor of the bed of truck 80. Referring simultaneously to FIGS. 1 and 2, side rails 2 and 6 form inwardly opening "C" channels 4, the floors of the "C" channels 4 serving as roller tracks, and the ceilings of the "C" channels 4 serving as roller retainers. Referring again to FIG. 1, cross braces 8, 10, 12, 14, 16 and 18 span between and rigidly interconnect side rails 2 and 6 forming a rigid base frame.

Referring further to FIG. 1, a rigid glass rack carrying frame 32 comprises a supporting web of braces 30, the frame 32 supporting a pair of forwardly extending arms 42. Upwardly extending glass supporting arms or posts 44 are supported by frame 32 and arms 42 for securely storing and supporting glass panes 50. Arms 44 are preferably removably attached, allowing carriage of varying numbers of glass panes. The glass panes 50 are cushioned against damage and secured against longitudinal sliding motion with respect to truck 80 by rubber pads 46.

Referring further to FIG. 1, annularly flanged rollers 36 extend laterally outward from side walls 40 of the glass rack carrying frame 32, the rollers 36 being fixedly and rotatably mounted upon such side walls by threaded axle and nut combinations 48. Referring simultaneously to FIGS. 1 and 2, the rollers 36 are closely fitted for lateral extension into the "C" shaped concavities 4 of "C" channels of side rails 2 and 6, while avoiding, under normal conditions, frictional contact between the ceiling of such channels 4 and rollers 36.

Figure 3:
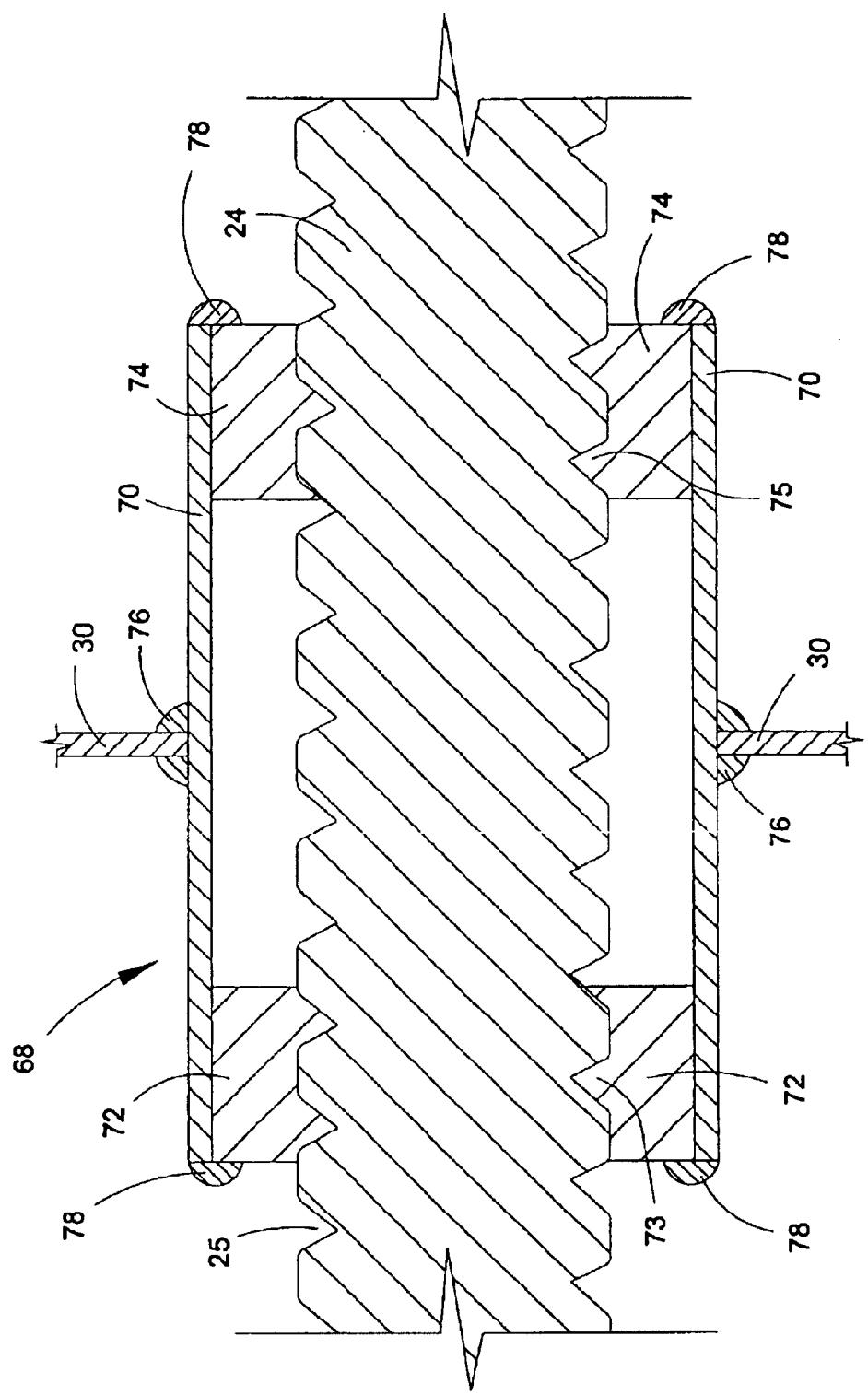
FIG. 3 is a partial sectional view as indicated in FIG. 1.

Referring simultaneously to FIGS. 1 and 3, a helically threaded or slotted lock bar 24 is rotatably mounted upon cross braces 10 and 18 by ball bearing mounts 26 and 28. A torque applying mechanism referred to generally by Reference Arrow 52 is provided, such mechanism 52 comprising a reversible electric motor 60 mounted upon cross brace 10 by motor mount bracket 58, and comprising a drive linkage consisting of a motor axle mounted pulley 64, a drive belt 62, and a pulley 66 mounted axially upon the forward end of lock bar 24. The reversible electric motor 60 is supplied with twelve volt electric power via power cord 56 extending to the electrical system of truck 80. Operation of the electric motor 60 is controlled by a three position electric switch 55 which alternately rotates, counter-rotates, and stops electric motor 60 via electric cable 54 by alternately reversing the polarity of power supplied to motor 60 and by breaking the power circuit.

Referring simultaneously to FIGS. 1 and 3, the mechanical juncture of lock bar 24 and a forward cross-bracing web member 30 of glass rack frame 32 is referred to generally by Reference Arrow 68, the lock bar 24 extending through aperture 34 of the forward wall of frame 32. Internally helically threaded nuts 72 and 74 are rigidly mounted within the bore of a short length of square tubing 70, the nuts 72 and 74 being fixed in place within the bore by welds 78. The square tubing length 70 is similarly fixed in place upon cross brace member 30 by welds 76, such welds securing square tube 70 within a fitted aperture extending through cross brace member 30. The distal or inwardly extending ends of helical threads 73 and 75 of nuts 72 and 74 serve as position locking bolts fitted for extension into and engagement with the helical slot or channel 25 of lock bar 24. While lock bar 24 remains motionless with respect to tube 70 and nuts 72 and 74, the walls of slot 25 hold bolts 73 and 75 in place, resisting longitudinal movement of tube 70 with respect to lock bar 24, and effectively locking glass rack frame 32 in place. Clockwise rotation of lock bar 24 causes the forwardly facing wall of slot 25 to engage and drive against the rearwardly facing walls of bolts 73 and 75, such engagement driving the glass rack carrying frame 32 forwardly. Conversely, counter-clockwise rotation of lock bar 24 drives such frame rearwardly.

In operation of the instant inventive glass pane handling assembly 1, referring to FIG. 1, manipulation of the three way switch 55 alternately and selectively rotates, counter-rotates, and stops the torque applying mechanism 52, resulting in selective rearward extension, forward retraction, and locking in place of the glass rack frame 32 and glass panes 50 carried by the assembly.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A glass pane handling assembly comprising:
    (a) a first frame having front, rear, left, and right sides, the left and right sides respectively comprising left and right roller or slide tracks;

(b) a lock bar having a longitudinal axis and a bolt receiving slot extending helically about the longitudinal axis, the lock bar being positioned between the left and right sides of the first frame and extending substantially parallel to said sides;

(c) first mounting means interconnecting the lock bar and the first frame;

(d) a second frame comprising means for supporting glass panes;

(e) rollable or slidable mounting means supporting the second frame upon the first frame;

(f) a bolt having a distal end;

(g) second mounting means interconnecting the bolt and the second frame, the second mounting means extending the distal end of the bolt into the lock bar's bolt receiving slot; and (h) rotating means operatively connected to the lock bar or to the bolt, said means being capable of alternately rotating and counter-rotating the lock bar or the bolt.

2. The glass pane handling assembly of claim 1 wherein the first mounting means rotatably mounts the lock bar, wherein the second mounting means rigidly mounts the bolt, and wherein the rotating means is operatively connected to the lock bar.

3. The glass pane handling assembly of claim 2 wherein the rotating means comprises a torque applying mechanism selected from the group consisting of electric motors, pneumatic motors, and hydraulic motors.

4. The glass pane handling assembly of claim 3 wherein the first mounting means comprise bearings selected from the group consisting of ball bearings, roller bearings, and sleeve bearings.

5. The glass pane handling assembly of claim 4 wherein the rollable or slidable mounting means comprise structures selected from the group consisting of rollers, wheels, linear roller bearings, linear ball bearings, and skids.

6. The glass pane handling assembly of claim 5 wherein the bolt extends helically about the lock bar's longitudinal axis.

7. The glass pane handling assembly of claim 6 wherein the means for supporting glass panes comprise a plurality of upwardly extending arms.

8. The glass pane handling assembly of claim 7 further comprising a three position power switch or valve, and a network of power communicating lines interconnecting the torque applying mechanism and the three position power switch or valve.

9. The glass pane handling assembly of claim 1 wherein the first mounting means rigidly mounts the lock bar, wherein the second mounting means rotatably mounts the bolt, and wherein the rotating means is operatively connected to the bolt.

10. The glass pane handling assembly of claim 9 wherein the rotating means comprises a torque applying mechanism selected from the group consisting of electric motors, pneumatic motors, and hydraulic motors.

11. The glass pane handling assembly of claim 10 wherein the second mounting means comprise bearings selected from the group consisting of ball bearings, roller bearings, and sleeve bearings.

12. The glass pane handling assembly of claim 11 wherein the rollable or slidable mounting means comprise structures selected from the group consisting of rollers, wheels, linear roller bearings, linear ball bearings, and skids.

13. The glass pane handling assembly of claim 12 wherein the bolt extends helically about the lock bar's longitudinal axis.

14. The glass pane handling assembly of claim 13 wherein the means for supporting glass panes comprise a plurality of upwardly extending arms.

15. The glass pane handling assembly of claim 14 further comprising a three position power switch or valve, and a network of power communicating lines interconnecting the torque applying mechanism and the three position power switch or valve.

* * * * *